US008818977B1

(12) United States Patent  
Garg et al.

(10) Patent No.: US 8,818,977 B1  
(45) Date of Patent: *Aug. 26, 2014

(54) CONTEXT SENSITIVE RANKING (75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/547,872

(22) Filed: Jul. 12, 2012

Related U.S. Application Data

(63) Continuation of application No. 13/485,150, filed on May 31, 2012, which is a continuation of application No. 12/400,646, filed on Mar. 9, 2009, now Pat. No. 8,209,331.

(60) Provisional application No. 61/041,854, filed on Apr. 2, 2008.

(51) Int. Cl.  
G06F 7/00 (2006.01)  
G06F 17/30 (2006.01)  
G06Q 30/02 (2012.01)

(52) U.S. Cl.  
CPC .... *G06F 17/30864* (2013.01); *G06F 17/30867* (2013.01); *G06F 17/30067* (2013.01); *G06F 17/30011* (2013.01); *G06Q 30/02* (2013.01)  
USPC ............................. 707/705; 707/751; 707/784

(58) Field of Classification Search  
CPC ................... G06F 17/30864; G06F 17/30867; G06F 17/30067; G06F 17/30011; G06Q 30/02  
See application file for complete search history.

(56) References Cited

U.S. PATENT DOCUMENTS

| | | |
|---|---|---|
| 6,594,670 B1 | 7/2003 | Genser |
| 6,859,800 B1 | 2/2005 | Roche et al. |
| 7,013,300 B1 | 3/2006 | Taylor |
| 7,219,073 B1 | 5/2007 | Taylor et al. |
| 7,295,995 B1 | 11/2007 | York et al. |
| 7,472,119 B2 | 12/2008 | Dai et al. |
| 7,610,279 B2 * | 10/2009 | Budzik et al. ............ 1/1 |
| 7,610,282 B1 | 10/2009 | Datar et al. |
| 7,617,200 B2 * | 11/2009 | Budzik et al. ............ 1/1 |
| 7,877,404 B2 | 1/2011 | Achan et al. |
| 7,881,981 B2 | 2/2011 | Taylor et al. |
| 2004/0162738 A1 | 8/2004 | Sanders et al. |
| 2005/0015601 A1 | 1/2005 | Tabi |
| 2005/0149395 A1 | 7/2005 | Henkin et al. |
| 2005/0149496 A1 | 7/2005 | Mukherjee et al. |
| 2005/0222981 A1 | 10/2005 | Lawrence et al. |
| 2006/0041562 A1 | 2/2006 | Paczkowski et al. |
| 2006/0224938 A1 | 10/2006 | Fikes et al. |

(Continued)

OTHER PUBLICATIONS

Agrawal et al., Context-Sensitive Ranking, Jun. 2006, ACM, pp. 383-394.*

(Continued)

*Primary Examiner* — Ajay Bhatia  
*Assistant Examiner* — Jessica N Le  
(74) *Attorney, Agent, or Firm* — Fish & Richardson P.C.

(57) ABSTRACT

Methods, systems, and apparatus, including computer program products, in which context can be used to rank search results. Context associated with a user session can be identified. A search query received during the user session can be used to identify a contextual click model based upon the context associated with the user session.

36 Claims, 3 Drawing Sheets

(56) References Cited

U.S. PATENT DOCUMENTS

| | | |
|---|---|---|
| 2006/0230035 A1 | 10/2006 | Bailey et al. |
| 2006/0230040 A1 | 10/2006 | Curtis et al. |
| 2006/0230058 A1 | 10/2006 | Morris |
| 2006/0288000 A1 | 12/2006 | Gupta |
| 2007/0033218 A1 | 2/2007 | Taylor |
| 2007/0038616 A1 | 2/2007 | Guha |
| 2007/0112764 A1 | 5/2007 | Yih et al. |
| 2007/0156761 A1 | 7/2007 | Smith |
| 2007/0214115 A1 | 9/2007 | Liu et al. |
| 2007/0244866 A1 | 10/2007 | Mishkanian et al. |
| 2007/0266025 A1 | 11/2007 | Wagner et al. |
| 2008/0033982 A1 | 2/2008 | Parikh et al. |
| 2008/0040341 A1 | 2/2008 | York et al. |
| 2008/0091650 A1 | 4/2008 | Fontoura et al. |
| 2008/0162387 A1 | 7/2008 | Singh et al. |
| 2009/0165109 A1 | 6/2009 | Hird |
| 2012/0059843 A1 | 3/2012 | O Donnell |

OTHER PUBLICATIONS

Chakrabarti, D. et al., "Contextual Advertising by Combining Relevance with Click Feedback", WWW 2008, Apr. 2008, p. 417-426.

Haveliwala, T.H., "Topic-Sensitive PageRank: A Context-Sensitive Ranking Algorithm for Web Search", IEEE Transactions on Knowledge and Data Engineering, vol. 15, No. 4, Jul. 2003, p. 784-796.

* cited by examiner

CONTEXT SENSITIVE RANKING

CROSS-REFERENCE TO RELATED APPLICATIONS

This application is a continuation of U.S. application Ser. No. 13/485,150, titled "Context Sensitive Ranking" filed May 31, 2012, which is a continuation of U.S. Pat. No. 8,209,331, titled "Context Sensitive Ranking" filed Mar. 9, 2009, which claims priority under 35 U.S.C. §119(e) to U.S. Provisional Application Ser. No. 61/041,854, titled "Context Sensitive Ranking" filed Apr. 2, 2008, the disclosures of each are incorporated herein by reference in their entireties.

BACKGROUND

This disclosure relates to ranking search results based on context.

A search engine allows a user to provide a search query for which search results are returned in response. However, some search queries might not lead to the results for which the user is searching. For example, if a user enters the search query "mobile phone," the user may be confronted with search results that include a broad spectrum of content, including retailers selling mobile phones, definitions associated with mobile phones, news articles about particular mobile phones, etc. However, a user is typically only searching for content related to a singular context. For example, the user entering the query "mobile phone" might actually be shopping for mobile phones. Thus, the query results in too much content being identified by the search engine.

Click models are used by conventional search engines to modify the ranking of search results in an attempt to provide more relevant results. Click models relate queries to search results that were selected for those queries along with statistics associated with those search results. This mapping of queries to user-selected search results can be interpreted as a signal of relevance between queries and search results, and can thus be used to rank search results in response to queries. While the use of click models can result in a more focused context for search results, the most popular context is not necessarily the context in which the user is interested.

SUMMARY

This specification describes technologies by which search results can be re-ranked according to context of a session.

In general, one aspect of the subject matter described in this specification can be embodied in methods that include the actions of identifying context associated with a user based upon content selected by the user during a session; receiving a search query associated with the session; identifying a contextual click model for the search query based upon the identified context; and providing the identified contextual click model based on the identified context in response to receiving the second search query, the contextual click model being operable to weight search results based upon the actions of past users in the identified context. Other embodiments of this aspect include corresponding systems, apparatus, and computer program products.

Particular implementations of the subject matter described in this specification can be implemented so as to realize one or more of the following advantages. One advantage of the disclosure is to provide search results based upon an identified context. Another advantage is to reduce overall breadth of search topics to the particular topics in which the user is interested. These advantages can be separately realized or realized in combination in various implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
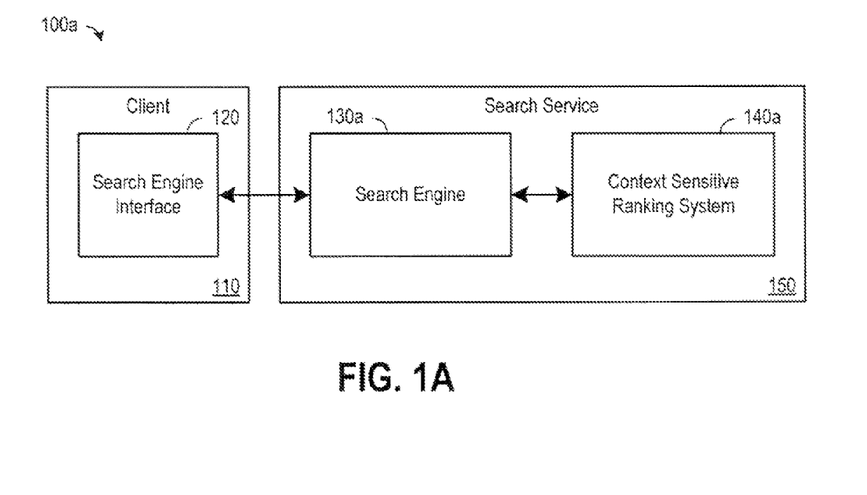
FIGS. 1A-B are block diagrams illustrating example search systems including context sensitive ranking

FIG. 1A is a block diagram illustrating an example search system 100a including context sensitive ranking The search system 100a can receive input from a client device 110. In some implementations, the search system 100a includes a search engine interface 120, a search engine 130a, and a context sensitive ranking system 140a. The search engine interface 120 can be implemented as a set of web pages through which a user interacts with the system 100, including a web page distributed to and displayed by the client (e.g., a browser) that enables the user using the client device 110 to submit a search query.

In some implementations, the search engine 130 can derive relevance scores associated with the most relevant pages (e.g., search results) based on the search query. In further implementations, the search engine 140 can derive rank scores associated with the quality of a web page as measured, for example, by the number of other sites linking to a page. The search engine 140 can also derive search results and scores (e.g., an information retrieval (IR) score) related to the search results. In some implementations, IR scores can be computed from, for example, dot products of feature vectors corresponding to a query and a document relevance, ranking scores, and/or combinations of IR scores and rank scores, etc. Other search engines can also be implemented.

In some implementations, a context sensitive ranking system 140a can identify a context (e.g., a category of interest) based upon the context associated with a received search query. The context can be defined by previous actions taken by the user (e.g., the selection of websites or web pages identified as associated with the context). For example, a first context might be defined by web pages A, B, C and D, such that when a user selects any of web pages A, B, C or D, the user is identified as being in the first context.

In some implementations, the selection of a website or web page can be defined by actions taken by the user with regard to one or more previous search queries. For example, if the user enters a first query, and selects from among a first set of results provided in response to the first query, the context sensitive ranking system can identify the actions of selecting from among the search results. The context sensitive ranking system 140a can then evaluate the selected search result(s) from the first set of results to identify a particular context, e.g., a "shopping" context if the selected search results are e-commerce related web sites; a "news" context if the selected search results are news related web sites; etc.

In some implementations, contexts can be identified, for example, by using hub sites. Hub sites can be identified by search engines based upon a high volume of traffic navigating to the hub site or page from a search engine (e.g., relative to other web pages identified by searches) and/or a number of other pages linking to the web page. In some examples, hub websites or web pages can be identified as part of the context by users. In other examples, hub websites or web pages can be identified as part of the context by the publisher of the website or web page.

In some implementations, the context includes hub websites or web pages can be supplemented with additional websites or web pages that can be defined as part of the context. In such implementations, a hub sites or pages can be identified from analysis of historical search engine data (e.g., search logs and click logs). Search sessions that include a selection of a hub site or page can be identified by analyzing click logs to identify when a hub site or page is selected and analyzing search logs to identify a search session that includes the hub site or page. A search session can be defined as a grouping of search queries that occur within a boundary (e.g., login/logout, temporal proximity, logical proximity (e.g., search queries that produce substantially similar search results), etc.). Once the search session has been identified, other websites or web pages that were selected within the search session can be aggregated into a cluster of websites or web pages. The cluster of website or web page selections can define the context.

In other implementations, the cluster of website or web page selections can be adjusted to remove (or not initially include) those websites or web pages that are not selected more than a threshold number of times during sessions that include selection of a hub site or page. For example, the cluster of selected sites or pages from sessions that included the selection of an official website of the Jacksonville Jaguars might also include thousands of selections of an ESPN web page, while only including a single selection of a cooking webpage. In this example, the number of selections of the cooking web page can be compared to the number of selections of the ESPN web page to determine that the selection of the cooking web page is an aberration.

In some implementations, the threshold used to adjust the cluster of sites or pages can be the number of times the website or web page is selected within sessions that included a selection of the hub site or page (e.g., 100 times). In other implementations, the threshold can be a frequency with which the website or web page is selected as compared to the total number of selections of other sites or pages within the search sessions that include selection of a hub site.

Clusters of websites or web pages can loosely define a category of search. In some implementations, the cluster of websites or web pages can be labeled by a user or an administrator. In other implementations, keywords can be extracted from the cluster of sites or pages in order to provide a label for the context that the cluster defines.

A website or web page might be identified as being a part of two different contexts. For example, Amazon.com might be identified as part of a "shopping" context, while also being identified as part of a "reviews" context. In some implementations, such a situation can be resolved by identifying the context in which it is most often selected and using that context to provide a contextual click model for ranking the search results for a query. In such implementations, a results page can further provide a link to the searcher enabling the searcher to change the context to the other context. In other implementations, the contextual click models can be merged and the merged click model can be used by the search engine to rank the search results. In some implementations, the merging of a click model can be based upon a scaling of the click model based on the probability that the selected website or web page is associated with a respective context. For example, if web page A is associated with a first context with a normalized probability of 0.8 while being associated with a second context with a normalized probability of 0.2, the click model selection weightings can be discounted to account for the probability that the selection is related to the first or the second context. The normalized probabilities can be multiplied by the selection metric for each record to identify a weighting to be applied to IR scores. In other implementations, the respective contextual click models for multiple context can be used to independently weight the search results. The respective sets of adjusted search results can then be merged to provide the ranked search results provided to the searcher.

In some implementations, the context can be used to re-rank the search results (e.g., by adjusting the IR scores or relevance of retrieved documents) identified by the search engine 130a. For example, if a user enters a first query and selects a shopping hub from among the search results presented for the first query, and then enters a second query, it can be determined that the user is searching for shopping content rather than news content, travel content, educational content, etc. Content that is related to the shopping context can be weighted to increase an IR score or relevance score associated with the related content. Conversely, content that is not related to the context can be discounted to decrease IR score or relevance score associated with the unrelated content.

In some implementations, a contextual click model for a search query can be identified to adjust the ranking of search results identified by the search engine. In some implementations, the contextual click models can be used to provide weightings that are applied to the IR scores derived by the search engines. The contextual click models can, however, also be used to adjust the search result rankings in other ways, such as re-ranking the search results that are provided by a search engine in response to a search query based on the context of the user entering the search query.

A contextual click model can be derived by identifying search sessions for previous users that have been identified as being in the same context. A search session can be identified as being in the same context when a search session includes a selection of one of the clustered websites or pages that define the context. Search queries that were received during search sessions identified as being in the same context can be aggregated to develop the click model. Each query in the context can be identified as having a contextual click model for the context. The query can be linked to a number of records. Each of the records can include a identification of the website or web page (e.g., universal resource locator (URL)) and a selection metric. In some examples, the selection metric correspond to a number of times a website or web page identified by the URL has been selected. In other implementations, the selection metric can be normalized to represent a frequency with which the website or web page has been selected. In some implementations, the record can also include a quality metric for the website or web page. One quality metric is derived from an average duration of a user visit after selection of the website or web page.

The contextual click model can be used to adjust the rankings of search results for a search query received during a session that has been identified as being within a given context. For example, if previous users searching in a given context have entered the query "Jaguars," the actions of previous users with respect to the search results for "Jaguars" can be identified and used to provide ranking of the search results according to the "sports" context. In this example, users in a given context who entered the query "Jaguars" might be 10 times more likely to retrieve a web page associated with the "Jacksonville Jaguars" football team than to retrieve a web page associated with Jaguar automobiles, while users that have not been identified as being within the context might be only 1.5 times more likely to retrieve a web associated with the "Jacksonville Jaguars" than to retrieve a web page associated with Jaguar automobiles. Thus, the contextual click model can adjust the rankings such that a web page associated with the "Jacksonville Jaguars" football team is ranked higher than a web page associated with Jaguar automobiles.

The search engine 130a can provide the re-ranked search results back to the search engine interface 120 for display to a user.

In some implementations, the search engine 130a and the context sensitive ranking system 140a can be provided within a search service 150. The search service 150 can include many different components (e.g., advertising, web portal, electronic mail service, photograph storage, etc.), and can be implemented in one or more data processing devices, such as one or more computer servers or server farms. In such implementations, the context of a user's session within the various component parts of the search service can be used in addition to the context of the user with respect to a search session to re-rank the search results associated with a current query. For example, if the user is reviewing e-mail related to an online merchant and/or selects a the merchant's website, the user's context can be recognized as a "shopping" context, and when a query is entered during the session, the "shopping" context can be used to identify a click model associated with the query.

Figure 1B:
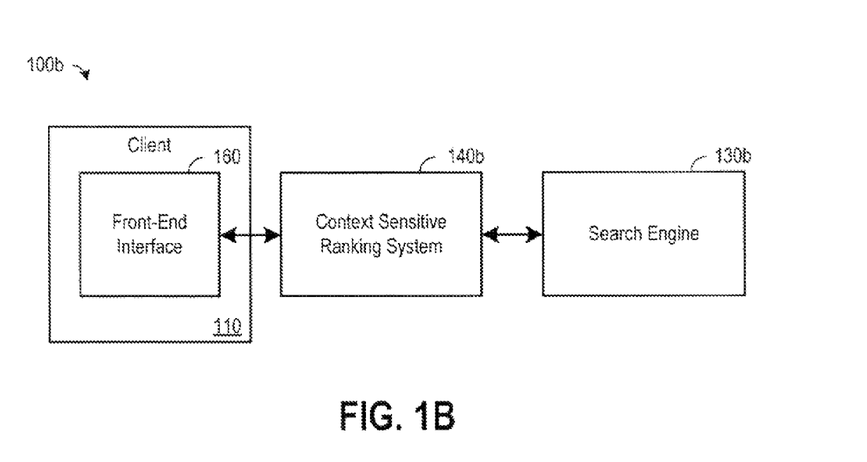

FIG. 1B is a block diagram illustrating an example search system including context sensitive ranking In some implementations, a context sensitive ranking system 140b can be provided independently of the search engine. For example, a third party application can be integrated into the system by a plug-in component to the search engine interface 120 located on the client device 110. In such examples, the search results to a query can be provided to the plug-in component (e.g., the context sensitive ranking system 130b) provided by a third party prior to display to a user. The context sensitive ranking system can analyze the search results based upon an associated user's previous context (e.g., websites recently visited), can request a click model based on the context and the query and adjust the rankings of the search results based upon the click model.

In other examples, the context sensitive ranking system can provide a front-end interface 160 to the user. The front-end interface 160 provided to the user can receive search queries and provide search results to the client device 110. In such examples, queries originating from the front-end interface 160 are received by the context sensitive ranking system 140b and forwarded to a search engine 130b. The context sensitive ranking system 140b then receives the search results from the search engine 130b and can apply a click model to weight the search results. The applied click model can be based upon a context identified with the user based upon previous actions detected by the user through the context sensitive ranking system 130b. The context sensitive ranking system can then provide the search results to the client device 110 through the front-end interface 160.

Figure 2:
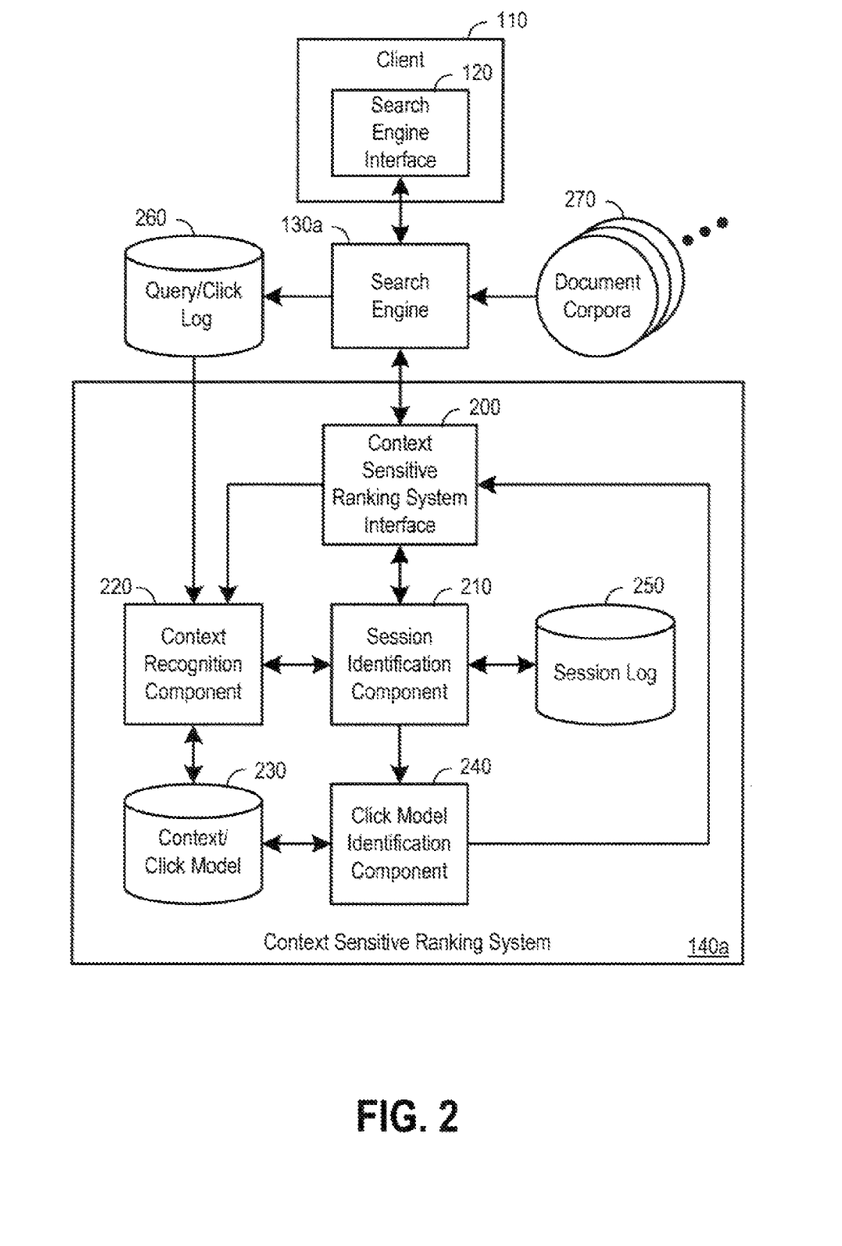
FIG. 2 is a block diagram illustrating an example of a context sensitive ranking system.

FIG. 2 is a block diagram illustrating an example of a context sensitive ranking system 140a. In some implementations, the context sensitive ranking system 140a can include context sensitive ranking system interface 200, a session identification component 210, a context recognition component 220, a context/click model data store 230, and a click model identification component 240.

The context sensitive ranking system interface 200 can operate to receive search queries from a search engine 130a. The search queries can originate from a client device 110 using a search engine interface 120. The context sensitive ranking system interface 200 can also operate to receive identification of context. For example, if a user is using a shopping portal associated with the search engine 130a, the context can be identified as a shopping context. Alternatively, if a user is searching for the query "mobile phones" and selects a search result that is a news web page, the context can be identified a news context.

In some implementations, when the context sensitive ranking interface 200 receives a search query from the search engine 130a, the context sensitive ranking interface 200 can communicate the search query to a session identification component 210. The session identification component can determine whether the query is part of a current session based upon a session log 250.

In some implementations, the session identification component 210 can define search sessions by a period of time between navigation activities (e.g., queries, web page navigation, portal use, etc.). For example, if a particular client indicates a navigation, a current search session can be initiated. The current search session can be terminated by the session identification component 210 when the search engine has not received further navigation from the user for a preset period of time (e.g., 5-10 minutes). In other implementations, the session identification component can define search sessions based on a user indicating the beginning and end of a search session (e.g., by logging into a search engine interface and logging out of a search engine interface). In still further implementations, the search session can be defined by a relationship between a newly requested navigation and previously requested navigation from the same client device or user. In some examples, a relationship can be identified based upon a current search query including a common search term to a previous search query from the user. In another example, a relationship can be identified based upon similar pages matching previous search results or a topic associated with the previous search queries or results. For example, related search queries might produce similar results. Thus, a previous search query might produce result pages A, B, C and D. A new search query might produce result pages C, E, F and G. These search queries can be identified as related because they result in at least one of the same pages being produced by the search engine. In further implementations, any of the foregoing techniques can be combined to identify whether a new navigation activity belongs to a session. For example, a new search query received from an identical user within a threshold time after a previous search query associated with the session has been received can be compared to previous search queries associated with the session to determine whether a relationship exists between the new search query and the previous search queries associated with the session.

If a new query is not related to a previous navigation from the same client device or user, or is not received within a threshold time period from the previous navigation, a new session can be initiated in the session log 250. The session identification component 210 can also notify the context sensitive ranking system interface 200 that the search query is associated with a new session. The context sensitive ranking system interface 200 can then communicate to the search engine 130a that there is no contextual click model associated with the new query.

However, if a received query is part of a current session, the session identification component 210 can communicate information identifying the search session to a click model identification component 240. The click model identification component can identify a contextual click model associated with the received query from a context/click model data store 230. If there is no context associated with the identified search session (e.g., a user entered a search query and then entered a second query without selecting any results, the new query does not match any click models in the specified context), the click model identification component 240 can communicate with the context sensitive ranking system interface 200 to notify the search engine 130a that there is no contextual click model associated with the identified search session.

If a contextual click model for the received search query and context is located, the click model identification component 240 can retrieve the contextual click model. The click model identification component 240 can send the retrieved contextual click model to the context sensitive ranking system interface 200 for communication to the search engine 130a. The search engine can thereby use the retrieved contextual click model to adjust the rankings of the search results.

Contextual click models for search queries can be derived, in some implementations, by the context recognition component 220. In some implementations, the context recognition component 220 can identify contexts for users by analyzing a click/query log 260. The query/click log 260 can include search queries received from multiple users of the search engine 130a as well as selections (e.g., clicks) from the search results provided as a result of those search queries. In some examples, the context recognition component 220 can use an selection of a hub web page as an indication of a context associated with previous sessions.

In some implementations, the context recognition component 220 can identify a web page as a hub based upon a high volume of traffic navigating to the web page from the search engine (e.g., relative to other web pages identified by searches) and/or a number of other pages linking to the web page. For example, very popular shopping and e-commerce web pages may be hub pages for a shopping context; very popular news pages may be hub pages for a news context; etc. The context recognition component 220 can analyze the search queries and click logs to identify those sessions that included the selection of hub web page.

Once the sessions that include the selection of a hub web page have been identified, the search queries and selections of search results associated with those queries can be used to derive a contextual click model associated with the search queries. For example, if a hundred sessions are identified where a hub website was selected, and a common query within those sessions resulted in selection of one of websites A, B, C, or D, the selection of those sites can be used to provide a contextual click model for the common query. In this example, the click log might be analyzed to determine that 30% of users entering the common query in the same session as selecting the hub, selected website A in response to the common query results, 50% of the users selected website B, 5% of the users selected website C, and 15% of the users selected website D.

Identification of a current session where the user has previously selected the hub website, and in which a current query matches the common query can result in rankings adjustments for search results A, B, C and D. The adjusted rankings can be weighted take into consideration the percentage of previous users who visited the hub website and then entered the common query and continued to the respective websites A, B, C and D. Using the example of the previous paragraph, website B can be heavily weighted based upon the inference that because it was visited by 50% of previous users that selected the hub site, it is more likely to be selected by a current user that has selected the hub website during the current session.

In some implementations, the weightings assigned to the websites can be based upon an expected selection rate (e.g., click rate). For example, websites A, B, C and D result from the same search query and website A might initially be assigned the IR score among the search results and put in a first ordinal position among search results. A website presented in a first ordinal position in the search results might be expected to be selected, for example, 50% of the time. If website A was only selected by 30% of the users, it can be said to be underperforming and can be discounted in the click model weightings. The website can be discounted by the rate at which the site is underperforming. In the above example, because website A is only performing at 30% while 50% would be expected, the website A can have a weighting factor of 0.6 (0.6=60%=30%/50%). The weighting factor can be multiplied by the ranking to provide an adjusted ranking.

In some implementations, a website is compared to a predefined threshold before it is included in a contextual click model. For example, if users who visited a hub website in a session have only selected a first website only four times as a result of a search query while several other websites have been selected thousands of times by those users as a result of the same search query, then it is unlikely that the first website will be relevant to users visiting the hub website. Thus, the first website can be eliminated from inclusion as a record within in the click model.

In other implementations, the fact that a website has been infrequently visited relative to other websites that result from the same search can be used to discount the ranking of the infrequently visited website. In the above example, the first website can be discounted in the ranking of the search results, while other websites that result in thousands of selections can be increased in ranking of the search results.

Each of the click model web pages include one or more context classifications. Context classifications can describe the type of website/web page associated with the context. For example, there might be a "news context" classification, a "travel context" classification, a "sports context" classification, a "shopping context" classification, a "educational context" classification, etc. Context classifications can be spread based upon classification of a relatively few hub websites/web pages. For example, if a hub website is classified as a sports context, the click models associated with the hub website can also be classified as sports web pages. The context classifications associated with the hub web pages can be provided, for example, by administrators (e.g., administrators of the hub web pages themselves, or administrators of the context sensitive ranking system). In other examples, the hub web pages can be classified by users through a voting system. In still further examples, keywords associated with each of a plurality of context classifications can be provided to an automated hub classification system, which can find all occurrences of the keywords on the hub web page and return a determination identifying the context classification to which the hub belongs.

In some implementations, a selected web page (e.g., a search result selection, a portal navigation, etc.) can be received by the context sensitive ranking system interface 200. The selected web page can be communicated to the context recognition component 220. The context recognition component 220 can search each of the click models in the context/click model data store 230 to determine whether the selected web page matches a web page present in any of the click models. If the selected web page is present in one of the click models stored in the context/click model data store 230, the context recognition component 220 can assign a context classification having a number of associated click models for various search queries to the current session associated with the contextual web page. The assignment of the contextual classification to a current session can be based, for example, on a session identification retrieved through the session identification component 210. The context recognition component 220 can store the assigned context information to a context/click model data store 230, such that the context can be identified by session, and a click model for a specified search query can be retrieved based upon the context associated with the session.

Figure 3:
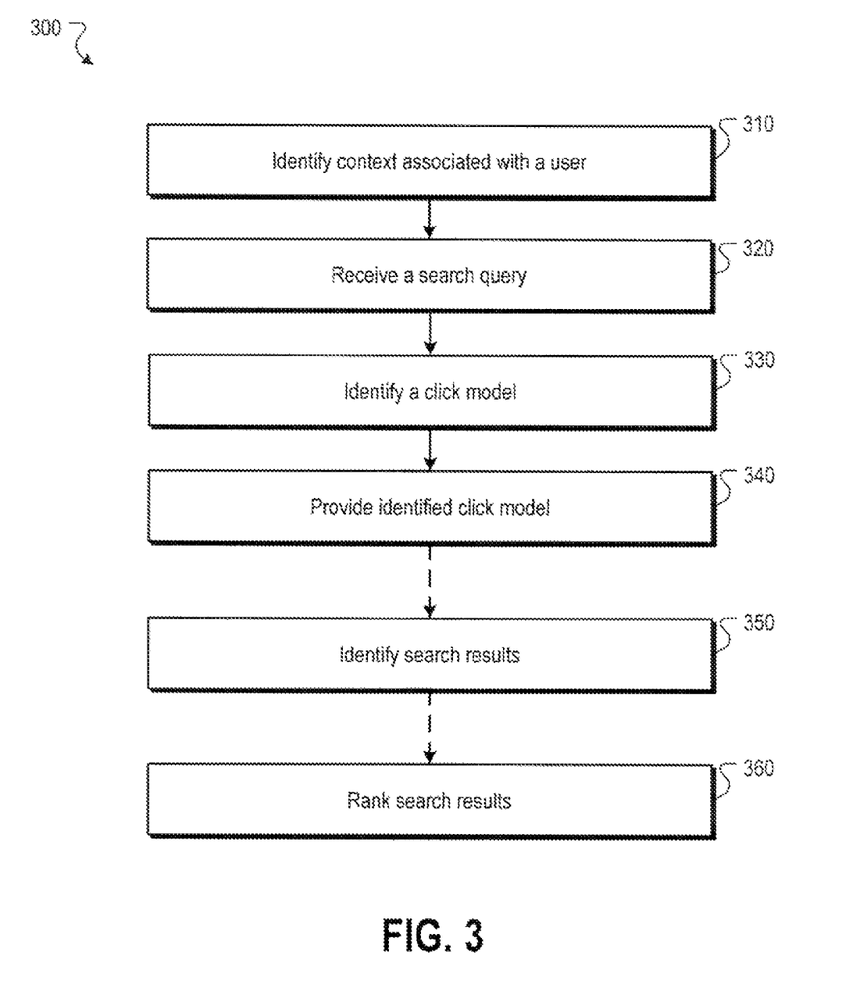
FIG. 3 is a flowchart illustrating an example process for context sensitive ranking.

FIG. 3 is a flowchart illustrating an example process 300 for context sensitive ranking The process 300 can, for example, be used in the context sensitive ranking system 140 of FIGS. 1 and 2. Other system and software implementations can also be used.

Context associated with a user is identified (310). The context associated with a user can be identified, for example, by a context recognition module (e.g., context recognition module 220 of FIG. 2). In some implementations, the context can be identified based upon content selected by the user during a session. The session, in some implementations, can include any of a search query, a web portal navigation, an advertisement navigation, etc. The user can refer to the user or an associated client device, in various instances.

In some implementations, the context recognition module has previously identified a number of web pages associated with a context. The selected content (e.g., selected web pages) can be compared to the identified web pages associated with the context to determine whether the context is associated with the user. The web pages, for example, can be identified by their inclusion in a click model associated with the context. The click models (e.g., contextual click models) can be identified based upon clustering identical previous search queries and identifying those search results that were selected by previous users entering those previous search queries. The search results can then be filtered, for example, by the context associated with the respective sessions. The context of the respective sessions can be identified, for example, by the indication of navigation of hub web pages within the session. Hub web pages can be manually identified as associated with a context, or can be automatically identified as associated with a context based upon navigation statistics associated with the web page and relevance of the web page to keywords associated with the context.

A search query is received (320). The search query can be received, for example, by a context sensitive ranking system interface (e.g., context sensitive ranking system interface 200 of FIG. 2) in conjunction with a context data store (e.g., context/click model data store 230 of FIG. 2). The search query can originate from a user (e.g., client device). In some implementations, the search query can be analyzed by a session identification component (e.g., session identification component 210), to determine that the search query occurs during a session, the same session as the previously identified context.

A click model is identified (330). The click model can be identified, for example, by a click model identification component (e.g., click model identification component 240 of FIG. 2) in conjunction with a click model data store (e.g., context/click model data store 230 of FIG. 2). The click model for the search query is identified based upon the context associated with the session.

The identified click model is provided (340). The identified click model can be provided, for example, by a context sensitive ranking system interface (e.g., context sensitive ranking system interface 200 of FIG. 2) in conjunction with the click model identification component 240 of FIG. 2). The identified click model can be provided in response to the search query. The click model is operable to weight search results based upon the actions of past users in the identified context. A search engine (e.g., search engine 130a of FIG. 2) can be used to apply the search model to the search results and to rank the search results accordingly. In some implementations, the identification of the click model occurs internally to a search engine and is provided to a ranking component within the search engine. In other implementations, the identification of the click model occurs externally to the search engine can is provided to the search engine for ranking the results.

In some implementations, the process 300 can include identifying search results (350). The search results can be identified, for example, by a search engine (e.g., search engine 130a of FIG. 2). The search results can be identified as responsive to the search query. In some implementations, the search results can be identified based upon the relevance of a web page to a search query and based upon a number of nodes linking to the web page.

Optionally, the search results are ranked (360). The search results can be ranked, for example, by a search engine (e.g., search engine 130a of FIG. 2). In some implementations, the search results are ranked based upon multiplying an IR score by a click model metric associated with respective web page results to the search query. The product of the IR score and the click model metric can be used to provide a metric by which to ranking the search results.

Partitioning click models into specific contexts can thereby provide search results for users that are more relevant to the user based on his/her context.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, for a current user session and by one or more computers, a user context that is indicative of a category of user interest for the user session, the determination being based on content provided to a particular user during the current user session, wherein determining the user context comprises:
      determining that the content provided to the particular user during the current user session includes a hub page, the hub page being a page that has been identified as part of both a first context and a second context, the first context being different from the second context, and each of the first context and the second context being identified based at least in part on characteristics of the hub page;
      identifying previous user sessions that include requests for the hub page;
      obtaining a first metric for the first context, the first metric being calculated based on a frequency with which the previous user sessions that included requests for the hub page were determined to be part of the first context;
obtaining a second metric for the second context, the second metric being calculated based on a frequency with which the previous user sessions that included requests for the hub page were determined to be part of the second context; and
determining that the user context is one of the first context or second context based on the first metric and the second metric; and
receiving, during the user session and after determining the user context, a user search query from the particular user; and
providing, by one or more computers and in response to receiving the user search query, ranked search results for the user search query, the ranking being based at least in part on a first contextual click model for the user context.

2. The computer-implemented method of claim 1, further comprising identifying the first contextual click model, the identification comprising:
identifying previous search sessions that include selection of a web page that is identified as part of the user context;
identifying occurrences of the user search query in the identified previous search sessions;
identifying previously selected web pages that were selected in previous sessions as a result of the user search query; and
wherein the first contextual click model comprises the previously selected web pages and a selection metric defining a rate at which the previously selected web pages were selected as a result of the user search query.

3. The computer-implemented method of claim 2, wherein the first contextual click model further comprises a click quality metric for the selections of each web page.

4. The computer-implemented method of claim 1, further comprising:
determining, during the user session and by one or more computers, a second user context for the user session by comparing web pages provided to the user during the user session with a plurality of web pages defining the second user context;
identifying, by one or more computers, a second contextual click model for the user search query based upon content provided to past users during sessions that were previously identified as being associated with the second user context; and
merging the first contextual click model and the second contextual click model.

5. The computer-implemented method of claim 4, wherein merging the first contextual click model and the second contextual click model comprises scaling a selection metric for the first contextual click model based upon a probability that the first contextual click model applies and scaling a selection metric for the second contextual click model based upon a probability that the second contextual click model applies.

6. The computer-implemented method of claim 1, further comprising generating a plurality of contextual click models for respective search queries associated with the user context, each contextual click model being operable to provide weightings for search results for respective search queries, and wherein the first contextual click model is one of the plurality of contextual click models.

7. The computer-implemented method of claim 1, wherein the user context comprises one or more of a news context, a shopping context, a travel context or an educational context, wherein the news context is determined when it is identified that the user is navigating sites related to news content, the shopping context is determined when it is identified that the user is navigating sites related to shopping content, the travel context is determined when it is identified that the user is navigating travel content and the educational context is determined when it is identified that the user is navigating educational content; and
wherein the first contextual click model associated with the user context is operable to increase the ranking of content related to the user context.

8. The computer-implemented method of claim 1, further comprising:
identifying search results responsive to the user search query; and
ranking the search results according to the first contextual click model.

9. The computer-implemented method of claim 1, wherein the characteristics of the hub page comprise an explicit context identifier provided by one or more of:
a hub page publisher; and
a context sensitive ranking system administrator.

10. The computer-implemented method of claim 1, wherein each user session is defined by a predetermined maximum period of time between the user search query and a second search query.

11. The computer-implemented method of claim 1, wherein each user session is defined by a login and logout time associated with the user.

12. The computer-implemented method of claim 1, wherein determining the user context further comprises:
providing data that causes a prompt to be provided to the particular user, the prompt displaying a choice of the first context or second context;
receiving user input indicating a selection of one of the first context or second context; and
designating the user context as the selected context.

13. A system, comprising:
a data processing apparatus; and
a data store storing instructions that, when executed by the data processing apparatus, cause the data processing apparatus to perform operations comprising:
determining, for a current user session and by one or more computers, a user context that is indicative of a category of user interest for the user session, the determination being based on content provided to a particular user during the current user session, wherein determining the user context comprises:
determining that the content provided to the particular user during the current user session includes a hub page, the hub page being a page that has been identified as part of both a first context and a second context, the first context being different from the second context, and each of the first context and the second context being identified based at least in part on characteristics of the hub page;
identifying previous user sessions that include requests for the hub page;
obtaining a first metric for the first context, the first metric being calculated based on a frequency with which the previous user sessions that included requests for the hub page were determined to be part of the first context;
obtaining a second metric for the second context, the second metric being calculated based on a frequency with which the previous user sessions that included requests for the hub page were determined to be part of the second context; and determining that the user context is one of the first context or second context based on the first metric and the second metric; and receiving, during the user session and after determining the user context, a user search query from the particular user; and providing, by one or more computers and in response to receiving the user search query, ranked search results for the user search query, the ranking being based at least in part on a first contextual click model for the user context.

14. The system of claim 13, wherein the operations further comprise identifying the first contextual click model, the identification comprising:

identifying previous search sessions that include selection of a web page that is identified as part of the user context;

identifying occurrences of the user search query in the identified previous search sessions;

identifying previously selected web pages that were selected in previous sessions as a result of the user search query; and wherein the first contextual click model comprises the previously selected web pages and a selection metric defining a rate at which the previously selected web pages were selected as a result of the user search query.

15. The system of claim 14, wherein the first contextual click model further comprises a click quality metric for the selections of each web page.

16. The system of claim 13, wherein the operations further comprise:

determining, during the user session and by one or more computers, a second user context for the user session by comparing web pages provided to the user during the user session with a plurality of web pages defining the second user context;

identifying, by one or more computers, a second contextual click model for the user search query based upon content provided to past users during sessions that were previously identified as being associated with the second user context; and merging the first contextual click model and the second contextual click model.

17. The system of claim 16, wherein merging the first contextual click model and the second contextual click model comprises scaling a selection metric for the first contextual click model based upon a probability that the first contextual click model applies and scaling a selection metric for the second contextual click model based upon a probability that the second contextual click model applies.

18. The system of claim 13, wherein the operations further comprise generating a plurality of contextual click models for respective search queries associated with the user context, each contextual click model being operable to provide weightings for search results for respective search queries, and wherein the first contextual click model is one of the plurality of contextual click models.

19. The system of claim 13, wherein the user context comprises one or more of a news context, a shopping context, a travel context or an educational context, wherein the news context is determined when it is identified that the user is navigating sites related to news content, the shopping context is determined when it is identified that the user is navigating sites related to shopping content, the travel context is determined when it is identified that the user is navigating travel content and the educational context is determined when it is identified that the user is navigating educational content; and wherein the first contextual click model associated with the user context is operable to increase the ranking of content related to the user context.

20. The system of claim 13, wherein the operations further comprise:

identifying search results responsive to the user search query; and ranking the search results according to the first contextual click model.

21. The system of claim 13, wherein the characteristics of the hub page comprise an explicit context identifier provided by one or more of:

a hub page publisher; and a context sensitive ranking system administrator.

22. The system of claim 13, wherein determining the user context further comprises:

providing data that causes a prompt to be provided to the particular user, the prompt displaying a choice of the first context or second context;

receiving user input indicating a selection of one of the first context or second context; and designating the user context as the selected context.

23. One or more non-transitory computer readable media, comprising instructions that when executed by data processing apparatus cause the data processing apparatus to perform operations comprising:

determining, for a current user session and by one or more computers, a user context that is indicative of a category of user interest for the user session, the determination being based on content provided to a particular user during the current user session, wherein determining the user context comprises:

determining that the content provided to the particular user during the current user session includes a hub page, the hub page being a page that has been identified as part of both a first context and a second context, the first context being different from the second context, and each of the first context and the second context being identified based at least in part on characteristics of the hub page;

identifying previous user sessions that include requests for the hub page;

obtaining a first metric for the first context, the first metric being calculated based on a frequency with which the previous user sessions that included requests for the hub page were determined to be part of the first context;

obtaining a second metric for the second context, the second metric being calculated based on a frequency with which the previous user sessions that included requests for the hub page were determined to be part of the second context; and determining that the user context is one of the first context or second context based on the first metric and the second metric; and receiving, during the user session and after determining the user context, a user search query from the particular user; and providing, by one or more computers and in response to receiving the user search query, ranked search results for the user search query, the ranking being based at least in part on a first contextual click model for the user context.

24. A computer-implemented method, comprising:

determining, for a current user session and by one or more computers, a user context that is indicative of a category of user interest for the user session, the determination being based on content provided to a particular user during the current user session, wherein determining the user context comprises:
identifying a plurality of web pages as part of one or more contexts, each of the web pages being identified based upon inclusion of the web pages in one or more of a plurality of click models associated with the one or more contexts;
determining that the content provided to the particular user during the current user session includes a particular web page from the plurality of web pages, the particular web page being identified as part of both a first context and a second context, the first context being different from the second context;
obtaining a first metric for the first context, the first metric being calculated based on a frequency with which previous user sessions that included requests for the particular web page were determined to be part of the first context;
obtaining a second metric for the second context, the second metric being calculated based on a frequency with which the previous user sessions that included requests for the particular web page were determined to be part of the second context; and
determining that the user context is one of the first context or second context based on the first metric and the second metric; and
receiving, during the user session and after determining the user context, a user search query from the particular user; and
providing, by one or more computers and in response to receiving the user search query, ranked search results for the user search query, the ranking being based at least in part on a first contextual click model for the user context.

25. The method of claim 24, wherein each user session is defined by a predetermined maximum period of time between the user search query and a second search query.

26. The method of claim 24, wherein each user session is defined by a login and logout time associated with a corresponding user.

27. The method of claim 24, further comprising:
generating a plurality of contextual click models for respective search queries associated with the user context, each contextual click model being operable to provide weightings of search results for respective search queries.

28. The method of claim 24, further comprising:
determining that a second search query was not received within a predetermined period of time of the user search query; and
bypassing the provision of the first contextual click model.

29. The method of claim 24, wherein determining the user context further comprises:
providing data that causes a prompt to be provided to the particular user, the prompt displaying a choice of the first context or second context;
receiving user input indicating a selection of one of the first context or second context; and
designating the user context as the selected context.

30. A system, comprising:
a data processing apparatus; and
a data store storing instructions that, when executed by the data processing apparatus, cause the data processing apparatus to perform operations comprising:
determining, for a current user session and by one or more computers, a user context that is indicative of a category of user interest for the user session, the determination being based on content provided to a particular user during the current user session, wherein determining the user context comprises:
identifying a plurality of web pages as part of one or more contexts, each of the web pages being identified based upon inclusion of the web pages in one or more of a plurality of click models associated with the one or more contexts;
determining that the content provided to the particular user during the current user session includes a particular web page from the plurality of web pages, the particular web page being identified as part of both a first context and a second context, the first context being different from the second context;
obtaining a first metric for the first context, the first metric being calculated based on a frequency with which previous user sessions that included requests for the particular web page were determined to be part of the first context;
obtaining a second metric for the second context, the second metric being calculated based on a frequency with which the previous user sessions that included requests for the particular web page were determined to be part of the second context; and
determining that the user context is one of the first context or second context based on the first metric and the second metric; and
receiving, during the user session and after determining the user context, a user search query from the particular user; and
providing, by one or more computers and in response to receiving the user search query, ranked search results for the user search query, the ranking being based at least in part on a first contextual click model for the user context.

31. The system of claim 30, wherein each user session is defined by a predetermined maximum period of time between the user search query and a second search query.

32. The system of claim 30, wherein each user session is defined by a login and logout time associated with a corresponding user.

33. The system of claim 30, the operations further comprising:
generating a plurality of contextual click models for respective search queries associated with the user context, each contextual click model being operable to provide weightings of search results for respective search queries.

34. The system of claim 30, the operations further comprising:
determining that a second search query was not received within a predetermined period of time of the user search query; and
bypassing the provision of the first contextual click model.

35. The system of claim 30, wherein determining the user context further comprises:
providing data that causes a prompt to be provided to the particular user, the prompt displaying a choice of the first context or second context;
receiving user input indicating a selection of one of the first context or second context; and
designating the user context as the selected context.

36. One or more non-transitory computer readable media, comprising instructions that when executed by data processing apparatus cause the data processing apparatus to perform operations comprising:
determining, for a current user session and by one or more computers, a user context that is indicative of a category of user interest for the user session, the determination being based on content provided to a particular user during the current user session, wherein determining the user context comprises:

- identifying a plurality of web pages as part of one or more contexts, each of the web pages being identified based upon inclusion of the web pages in one or more of a plurality of click models associated with the one or more contexts;
- determining that the content provided to the particular user during the current user session includes a particular web page from the plurality of web pages, the particular web page being identified as part of both a first context and a second context, the first context being different from the second context;
- obtaining a first metric for the first context, the first metric being calculated based on a frequency with which previous user sessions that included requests for the particular web page were determined to be part of the first context;
- obtaining a second metric for the second context, the second metric being calculated based on a frequency with which the previous user sessions that included requests for the particular web page were determined to be part of the second context; and
- determining that the user context is one of the first context or second context based on the first metric and the second metric; and receiving, during the user session and after determining the user context, a user search query from the particular user; and providing, by one or more computers and in response to receiving the user search query, ranked search results for the user search query, the ranking being based at least in part on a first contextual click model for the user context.

* * * * *